US006286111B1

(12) United States Patent
Snover

(10) Patent No.: US 6,286,111 B1
(45) Date of Patent: Sep. 4, 2001

(54) RETRY MECHANISM FOR REMOTE OPERATION FAILURE IN DISTRIBUTED COMPUTING ENVIRONMENT

(75) Inventor: Jeffrey Phillip Snover, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/144,870

(22) Filed: Sep. 1, 1998

(51) Int. Cl.[7] .................................................... G06F 11/00
(52) U.S. Cl. .............................................. 714/4; 370/403
(58) Field of Search .................................. 714/4, 2, 8, 18, 714/25, 27, 31, 37, 39, 43, 44, 48, 49; 370/401, 403; 713/310, 323; 711/147, 148

(56) References Cited

U.S. PATENT DOCUMENTS

| | | | |
|---|---|---|---|
| 5,515,508 | * | 5/1996 | Pettus et al. ..................... 395/200.01 |
| 5,568,402 | * | 10/1996 | Gray et al. ....................... 364/515 C |
| 5,583,793 | * | 12/1996 | Gray et al. ....................... 364/514 C |
| 5,781,908 | * | 7/1998 | Williams et al. ..................... 707/104 |
| 5,802,305 | * | 9/1998 | McKaughan et al. .......... 395/200.57 |
| 5,915,119 | * | 6/1999 | Cone ................................. 395/750.02 |
| 5,938,771 | * | 8/1999 | Williams et al. ..................... 713/310 |
| 5,987,521 | * | 11/1999 | Arrowood et al. ................... 709/239 |
| 6,088,729 | * | 7/2000 | McCrory et al. ..................... 709/227 |
| 6,088,770 | * | 7/2000 | Tarui et al. ........................... 711/148 |
| 6,098,100 | * | 8/2000 | Wey et al. ............................ 709/223 |

* cited by examiner

Primary Examiner—Nadeem Iqbal
(74) Attorney, Agent, or Firm—Jeffrey S. LaBaw

(57) ABSTRACT

The present invention provides a mechanism for retrying a system operation on a remote node in a distributed environment. In an "optimistic" embodiment of the invention, a local system issues a set of commands over a network to a remote node to perform a system operation. Responsive to a failure by the remote node to perform the requested system action, the retry mechanism determines whether the remote node could be in a nonoperational state. If the remote node could be in the nonoperational state, the system issues a magic packet to the remote node. Next, the system waits a predetermined period of time for the remote node to be brought to a fully operational state. The system issues the set of commands a second time to the remote node to perform the system operation. In a "preemptive" or "pessimistic" embodiment of the invention, the likelihood that the remote node is in a powered down or similar state is sufficiently high to outweigh the cost of sending a magic packet over the network. Thus, to perform a system operation on a remote node, a magic packet is issued preemptively to the remote node over a network to bring it to a fully operational state. Then, the local system issues a set of commands over the network to the remote node to perform the system operation.

25 Claims, 5 Drawing Sheets

RETRY MECHANISM FOR REMOTE OPERATION FAILURE IN DISTRIBUTED COMPUTING ENVIRONMENT

BACKGROUND OF THE INVENTION

The present invention is directed to managing a large distributed computer enterprise environment. More particularly, it relates to retrying a failed operation in a distributed computing environment.

It is well known to couple computer systems together by means of a network such as a local area network (LAN) or wide area network (WAN) to obtain access to computing resources located on a remote computer system. It is generally not economical feasible to provide a printer and expensive DASD at each user workstation. By connecting the resources of the entire network together and making these selectively available to users, a much greater and more efficient collection of resources can be mustered than would be possible if all resources were to be provided at each desktop.

However, managing a computer network comprising hundreds or even thousands of nodes to provide such computing resources can produce serious difficulties for system administrators. Management tasks, such as distribution of system-wide changes, must be carried out quickly and in a dependable manner in order to reduce the probability of catastrophic failure. Typically, a system operation is initiated at a central location, e.g., an administrator's workstation and invoked on one or more remote machines in the network. Preferably, system operations are invoked on a group or subnet of machines in a single operation. Yet distributed computing environments that are known in the art do not scale easily to large size.

There are many reasons why an operation invoked on a remote machine may fail including network failure and incompatible command syntax with the remote machine. One other reason that the operation may fail is that the target machine is down, either because the user has turned the machine off or some program, such as a power management program, has powered down the machine. To complete a software distribution, it is important to be able to do so over the entire network as quickly as possible.

The present invention addresses and solves these problems.

SUMMARY OF THE INVENTION

The present invention provides a mechanism for retrying a system operation on a remote node in a distributed environment. In an "optimistic" embodiment of the invention, a local system issues a set of commands over a network to a remote node to perform a system operation. Responsive to a failure by the remote node to perform the requested system action, the retry mechanism determines whether the remote node could be in a "node-down" or similar nonoperational state. If the remote node could be in the "node-down" state, the system issues a magic packet to the remote node. Next, the system waits a predetermined period of time for the remote node to be brought to a fully operational state. The system issues the set of commands a second time to the remote node to perform the system operation. In a "preemptive" or "pessimistic" embodiment of the invention, the likelihood that the remote node is in a "node-down" or similar state is sufficiently high to outweigh the cost of sending a magic packet over the network. Thus, expecting failure of a request for a system operation on a remote node, a magic packet is issued preemptively to the remote node over a network to bring it to a fully operational state. Then, the local system issues a set of commands over the network to the remote node to perform the system operation.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers in a collection of computers which operate under one or more of a number of different operating systems. The computer could be, for example, a personal computer, a mini computer, mainframe computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
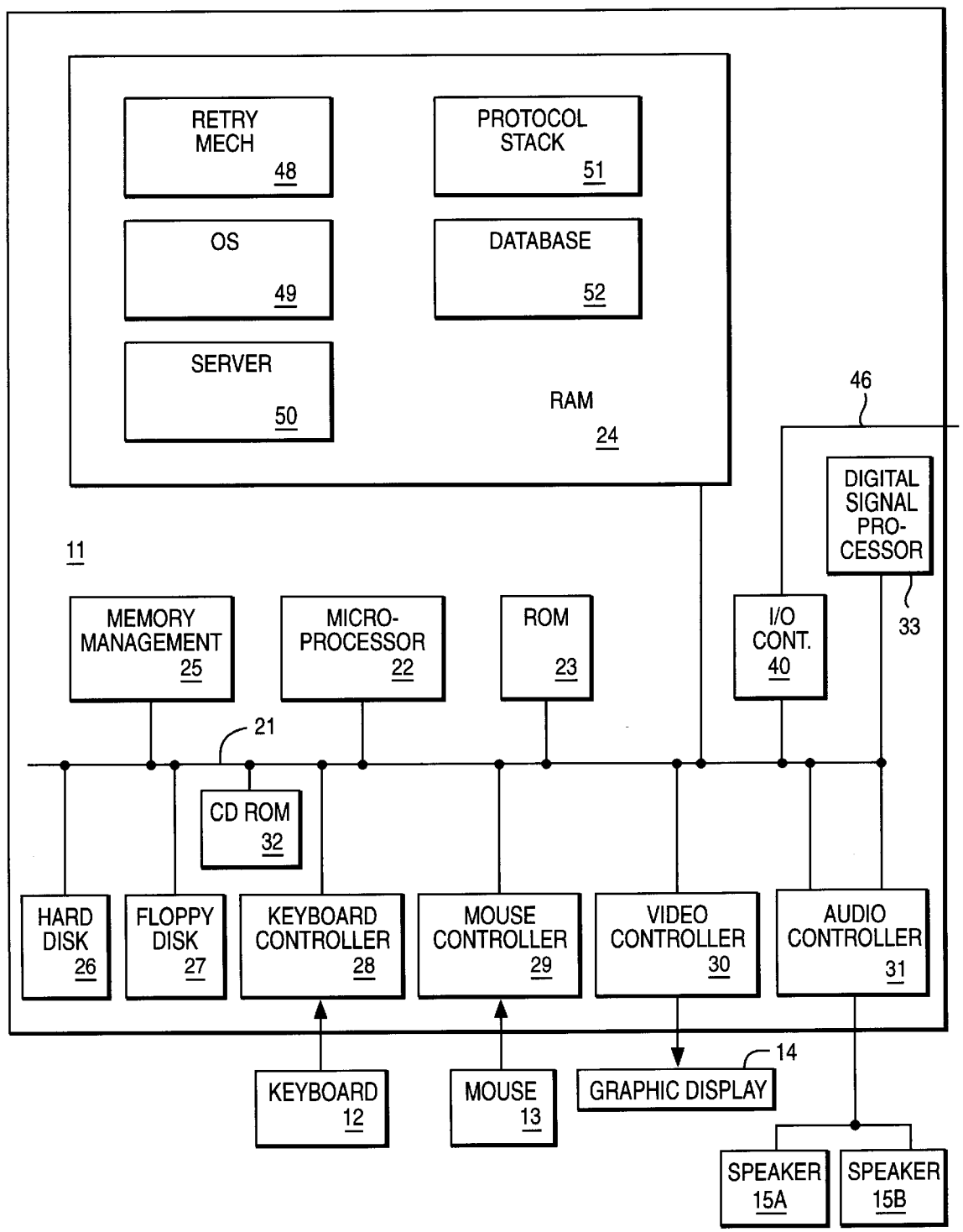
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

Figure 2:
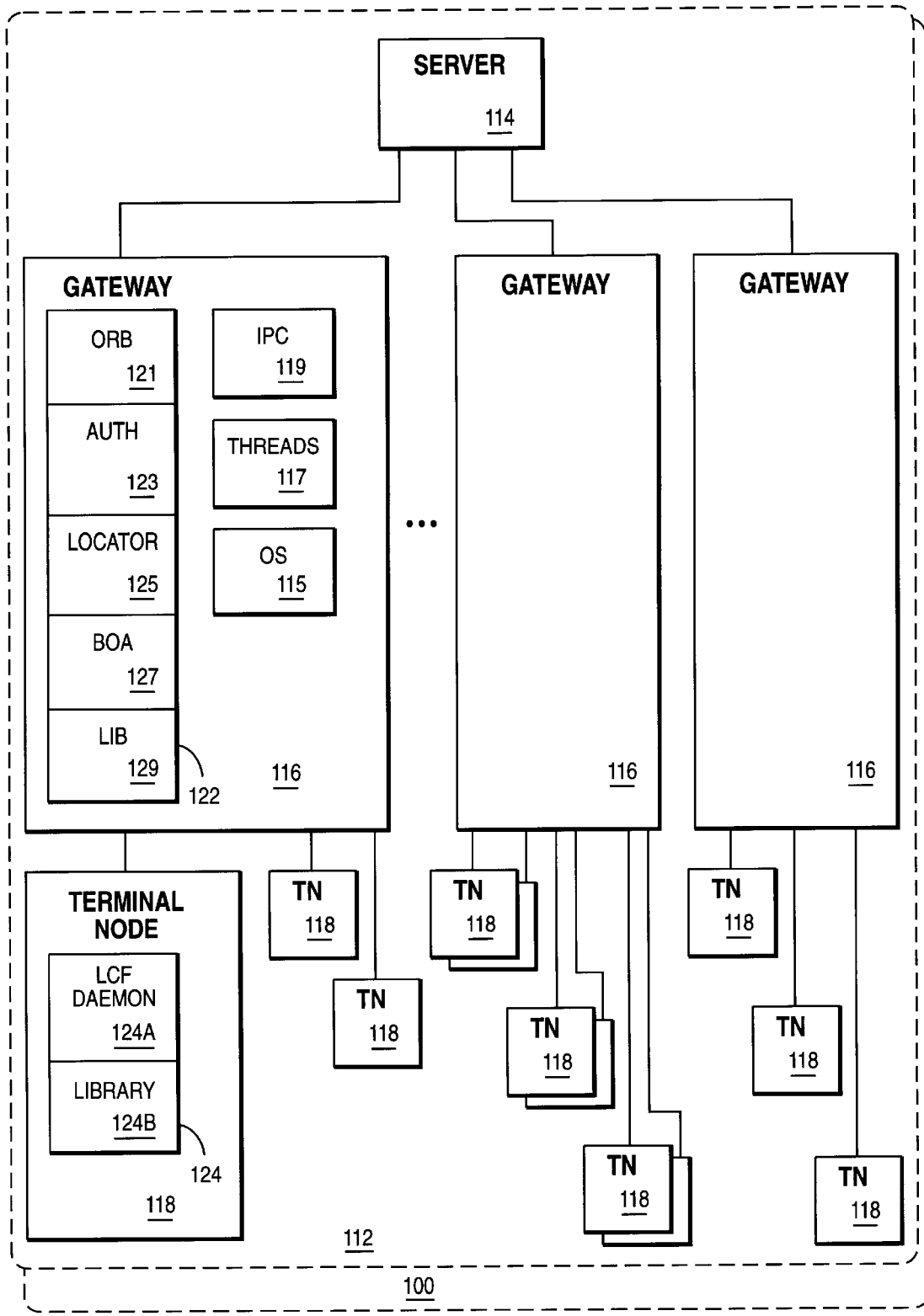
FIG. 2 depicts a distributed computing environment in which the invention has been implemented.

Referring now to FIG. 2, the invention is preferably implemented in a large distributed computer environment 100 comprising up to thousands or even tens of thousands of "nodes." At each node, will be located a system generally similar to that described above. The nodes will typically be geographically dispersed and the overall environment is "managed" in a distributed manner. Preferably, the managed environment (ME) is logically broken down into a series of loosely-connected managed regions (MR) 112, each with its own server 114 for managing local resources with the MR. Multiple servers 114 coordinate activities across the enterprise and permit remote site management and operation. Each server 114 serves a number of gateway machines 116, each of which in turn support a plurality of endpoints 118. The server 114 coordinates all activity within the MR using a terminal node manager 120.

Each gateway machine 116 runs a server component 122 of a system management framework. The server component 122 is multithreaded runtime process that comprises several components: an object request broker or "ORB" 121, an authorization service 123, object location service 125 and basic object adapter or "BOA" 127. Server component 122 also includes an object library 129. Preferably, the ORB 121 runs continuously, separate from the operating system, and it communicates with both server and client processes through separate stubs and skeletons via an inter process communication (IPC) facility 119. In particular, a secure remote procedure call (RPC) is used to invoke operations on remote objects. Gateway machines 116 also includes an operating system 115 and a threads mechanism 117.

The system management framework includes a client component 124 supported on each of the endpoint machines 118. The client component 124 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like. System management tasks involve system management "data", which generally is the information collected or distributed as part of a particular system management task.

In the large enterprise such as illustrated in FIG. 2, there is one server per MR with some number of gateways. For a workgroup-size installation, e.g., a local area network (LAN), a single server-class machine may be used as the server and gateway, and the client machines would run the lost cost framework. References herein to a distinct server and one or more gateway(s) should thus not be taken by way of limitation as these elements may be combined into a single platform. For intermediate size installations, the MR grows breadth-wise, with additional gateways then being used to balance the load of the endpoints.

In this preferred embodiment, the server is the top-level authority over all gateway and endpoint machines. The server maintains an endpoint list, which keeps track of every endpoint in a managed region. This list contains all information necessary to uniquely identify and manage endpoints including, without limitation, such information as name, location, and machine type. The server also maintains the mapping between endpoint and gateway, and this mapping is dynamic. Based on site-specific settings, it is possible to reassign endpoints when gateways go down or to automatically add new endpoints as they appear on the network.

As noted above, there are one or more gateways per managed region. A gateway is a full managed node that has been configured to operate as a gateway. Initially, a gateway "knows" nothing about endpoints. As endpoints login (discussed below), the gateway builds an endpoint list for its endpoints. The gateway's duties include: listening for endpoint login requests, listening for endpoint requests, and (its main task) acting as a gateway for method invocations on endpoints.

As also discussed above, the endpoint is a machine running the system management framework client component, which is referred to herein as the low cost framework (LCF). The LCF has two main parts as illustrated in FIG. 2: the lcf daemon 124a and an application runtime library 124b. The LCF daemon 124a is responsible for endpoint login and for spawning application endpoint executables. Once an executable is spawned, the LCF daemon 124a has no further interaction with it. Each executable is linked with the application runtime library 124b, which handles all further communication with the gateway machine.

While the distributed computing environment described above is preferred those skilled in the art will recognize that other distributed environments can be adapted to the teachings of the present invention.

The present invention extends a normal remote system operation with a retry mechanism which notices the failure of a remote operation at a target machine and analyzes the probable cause of failure. If the failure is likely to be due to a "node-down" condition, and if it is safe to do so, the retry mechanism generates a "Magic Packet" to wake up the target machine. The retry mechanism then waits a predetermined amount of time, i.e. so the system can bring itself to an operational state and then ascertains whether the node was woken up by the Magic Packet. If so, the retry mechanism reinvokes the operation on the target machine, in a manner which should be transparent to the user.

As used herein, a "node-down" condition could be a power-down condition caused by power management software or user action, or could be any state in which the system is not fully functional and ready to perform the specific network operation. In the future, it will be possible for systems to be at a variety of states which are neither fully "up" or "down" any of which may impact the effectiveness of a distributed network operation such as software distribution across a group of machines. Also, although the examples given herein are primarily directed to system management actions which span multiple machines, the reader should understand that many system management actions in a distributed environment are directed to a single machine.

Furthermore, although the preferred embodiment uses the Magic Packet technology developed by the AMD Corporation and licensed by many personal computer manufacturers, other similar mechanisms are encompassed by the invention. That is, any specific message which is recognized by nodes in the distributed environment as a command to "wake up" and bring themselves to an operational state should be considered a "magic packet" whether or not it exactly conforms to the details of the Magic Packet technology described below.

Figure 3:
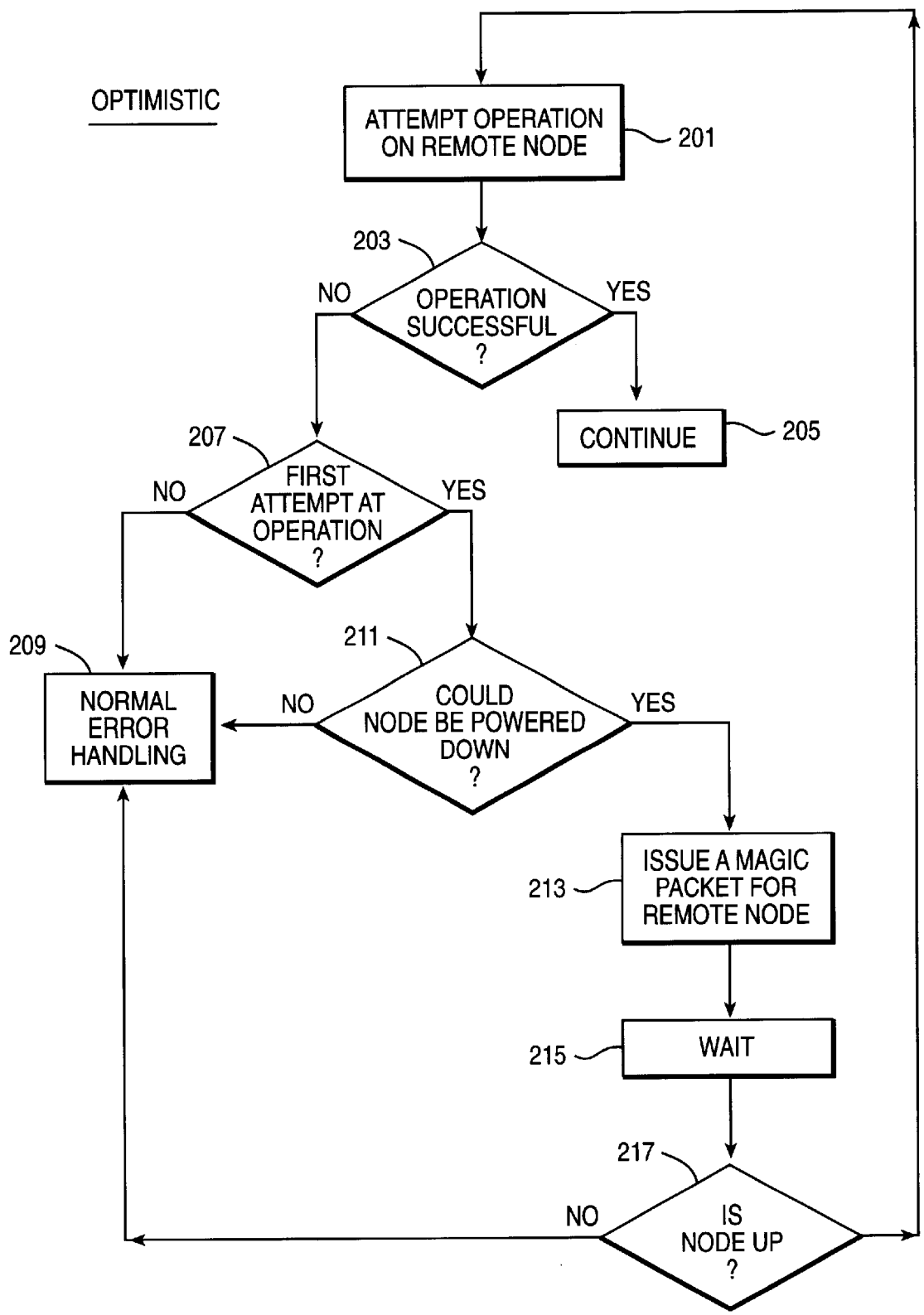
FIG. 3 shows a flow diagram of an "optimistic" process for performing the present invention.

As shown in the flow diagram of FIG. 3, the present invention can be implemented in an "optimistic" embodiment. That is, the assumption is made that most of the times a given system management operation will succeed, and so, it is not worth the extra bandwidth and processor cycles to send a magic packet preemptively. In the "pessimistic" embodiments below, other assumptions are made.

In step 201, a scheduled system management operation is made. For example, it might be a software distribution for the latest version of the management software for the distributed environment, scheduled at midnight for a selected group of users. Alternatively, it may be a security management task such as modifying the access permissions of a specific user or group of users. In step 203, a test is performed to determine whether the operation was successful, e.g., an acknowledgment was received from each of the target machines. If the operation was successful, the process ends, step 205, and the system is used for other operations. This might be to return to step 201 for a different system management operation.

If the operation was not successful, a test is performed to determine whether this was the first attempt at the operation for the given machine, step 207. This step prevents an endless loop where the retry mechanism repeatedly sends out magic packets to an unresponsive machine. If this was not the first attempt, normal error handling in step 209 is performed.

In step 211, a test is performed to determine whether the unresponsive node could be powered down. This could be done in a number of ways. A time out message can be an indication that the node is powered down. For example, in Windows NT a WSAETIMEOUT return code means that the TCP connection timed out for the given machine. Many connection oriented protocols expect acknowledgments back from the receiver that a message was safely received. Even when a connectionless protocol is used, many distributed applications have their own set of acknowledgments which are expected to be received within a given time from the target machine. In general, the lack of a response or a response from a gateway machine indicating that it is unsure whether a target node received the message or data needed to perform the intended system management operation can be the indication that the target machine could be powered down. Counter indications include a positive response back from the target, i.e. it received the message but was garbled in some way, or the successful completion of a recent system administrative action on the target machine. In the case of a software distribution to many nodes, the test may include collecting a set of nodes which may be powered down rather than a single node. If the target node could not reasonably be powered down, normal error handling, step 209, is performed.

If the test in step 211, determines that the node could be powered down, i.e. the probable reason for the for the failure, step 213 issues a magic packet to the node or nodes which failed. In the current implementation of the magic packet technology, the magic packet is broadcast to all nodes in the network. In the preferred embodiment of the invention, however, the magic packet would be unicast or multicast only to those nodes which might be powered down. Although the magic packet technology is benign and only under very unusual circumstances should affect the workings of distributed applications, excess traffic should be avoided, particularly when the number of nodes in the network is large. However, the existing broadcast implementation of the magic packet can be used in less preferred embodiments of the invention.

After the magic packet is sent, the retry mechanism waits, step 215, for a predetermined amount of time. This time is calculated so that the nodes which are powered down have an adequate amount of time to bring themselves to a fully operational state. An additional amount of time can be added to account for transmission delay and related variables across the network. Next, the retry mechanism verifies that the nodes to which the magic packets were sent are now up, step 217. This can be accomplished in many ways including the well known "ping" command. If the node is not up, standard error processing occurs, step 209.

If one or more of the nodes are now in a fully operational state after the magic packet command is sent, the retry mechanism returns to step 201 to retry the system management operation. Note in the case of multiple nodes, this may be a subset of the number which were sent the magic packet. During the second pass, either the operation is successful, and the process continues, step 205, or the retry mechanism passes the node to the normal error handling procedure, step 209. Of course, some nodes may be successful, while others fail. Further, alternative embodiments of the invention could allow more retries, e.g., sending a second magic packet, however, a single retry is viewed as the best use of network bandwidth by the inventor.

Figure 4:
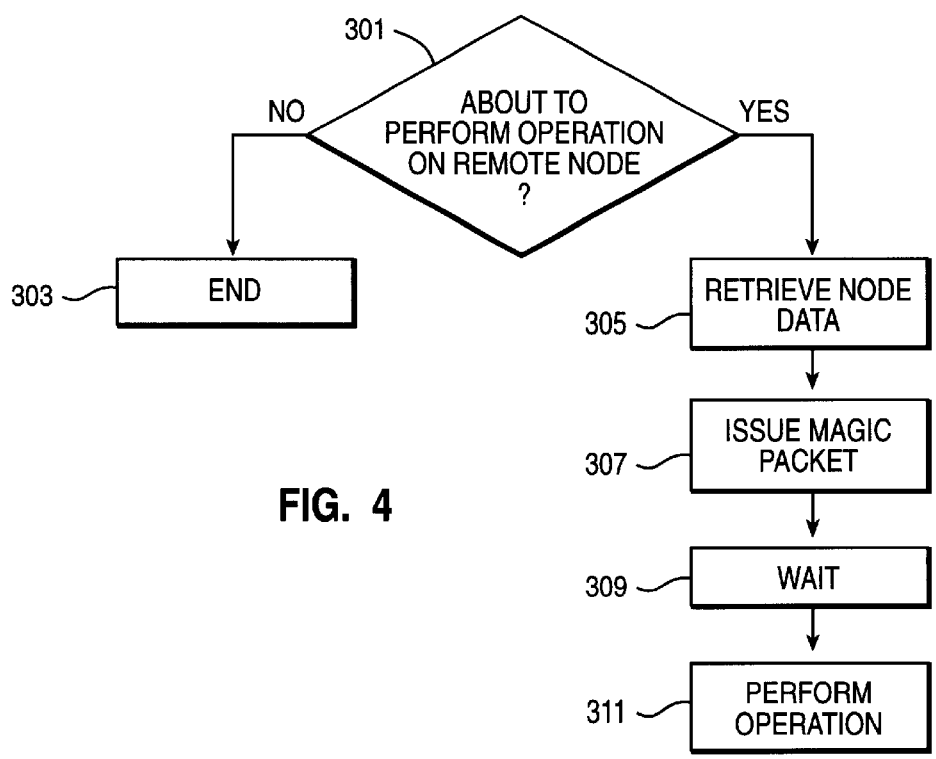
FIG. 4 shows a flow diagram of a "pessimistic" process for performing the present invention.
Figure 5:
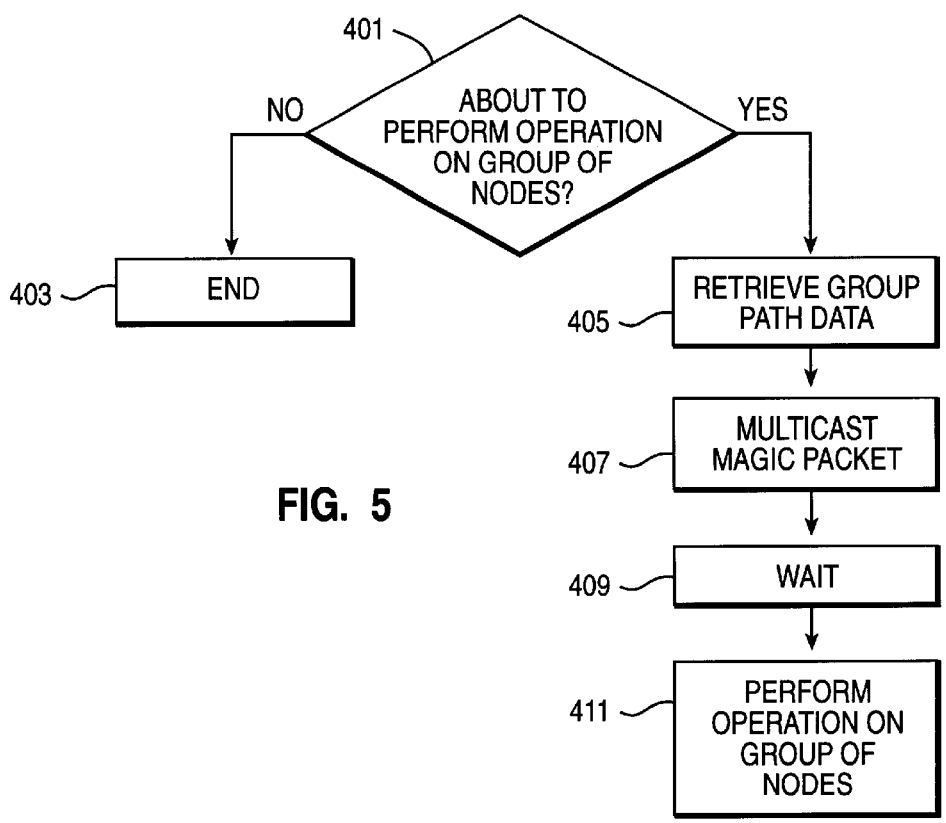
FIG. 5 is a flow diagram for a "pessimistic" group operation for the present invention.

In FIG. 4, a pessimistic embodiment of the invention is shown wherein the system management operation is planned for a single remote node. The pessimistic or preemptive embodiment of the invention, issues a magic packet first before attempting the system operation to wake up the remote node. Implicit in this embodiment of the invention is the assumption that the likelihood that the remote node will be powered down will offset the added bandwidth required for issuing the magic packet. Depending on the time and the type of remote system, this may be true. At night, the demands on the network are low so the added bandwidth for the magic packet is of negligible consequence. Further, it is more likely that the remote node will be powered down. Night or weekends are very good times to perform system maintenance type operations, so that the pessimistic embodiment of the invention may be the preferred embodiment for scheduled, off-shift operations.

In step 301, a decision whether the system, e.g., a software distribution server, is about to perform an operation on a remote node is made. If not, the pessimistic process ends, step 303. If such an operation is to take place, in step 305 data about the node, including its network address is retrieved from a database. In step 307, the magic packet is issued to the node on which the remote operation is to be performed. As before, the system waits a predetermined amount of time to allow a potentially powered down node to bring itself to an fully operational state, step 309. Finally, in step 311, the system action is performed on the remote node. If the operation fails, the system knows that the failure was not due to a power down situation and so normal error handling procedures (not shown) are performed.

As with the optimistic mode, the pessimistic mode can be performed for a group of remote nodes, where a system operation is contemplated for a subnet or other group on the network. However, because the entire group for a software distribution is apt to be much larger than the relatively few nodes which fail, the bandwidth requirements for a multicast pessimistic distribution is much greater than that for the multicast optimistic embodiment. Thus, this embodiment is probably best for periods of low network utilization. Otherwise, during peak hours, magic packet "storms" could potentially bring down the network at times when it is unlikely that most of the remote nodes would be in a powered down state.

The process is similar to that for a single node operation with additional information collected for the group. In step 401, a decision whether the system, e.g., a software distribution server, is about to perform an operation on a group of remote nodes is made. If not, the pessimistic process ends, step 403. If such an operation is to take place, in step 405 data about the group of nodes, including network addresses is retrieved from a database. This information may include information about the power management characteristics of the node in the group for which the distribution is planned. For older machines, not equipped to handle the magic packet technology, it will serve no purpose to issue magic packets. In a group of machines of mixed vintage, significant savings in bandwidth can be achieved if the older machines are culled from the list of machines which will receive the magic packet, but on which the system operation will be eventually performed. Information on machine roles, i.e. which are gateways or servers or perform other mission critical roles which are unlikely to be in a powered down state, can be further used to pare down the list of nodes to receive the magic packet.

In step 407, the magic packet is issued to the list of nodes on which the remote operation is to be performed which might benefit from the wake up call. Preferably, unicast is used as current implementations of multicast send the packet to all machines on particular subnet. However, a modified multicast sent only to the members of the list could be used by the present invention. As before, the system waits a predetermined amount of time to allow a potentially powered down node to bring itself to an fully operational state, step 409. Note that for a group of nodes, the wait time might be variable according to the network path and conditions for different endpoints. Finally, in step 411, the system action is performed on the remote node. Note that for the machines which were not sent magic packets, the system action can be initiated during the wait step 409. Thus, the software distribution could have two waves; the first wave for the older machines without the magic packet technology, the second wave is for the new machines equipped with the technology. If the operation fails at any node, the system knows that the failure was not due to a power down situation, at least one that can be remedied by a magic packet, and so normal error handling procedures (not shown) are performed.

Figure 6:
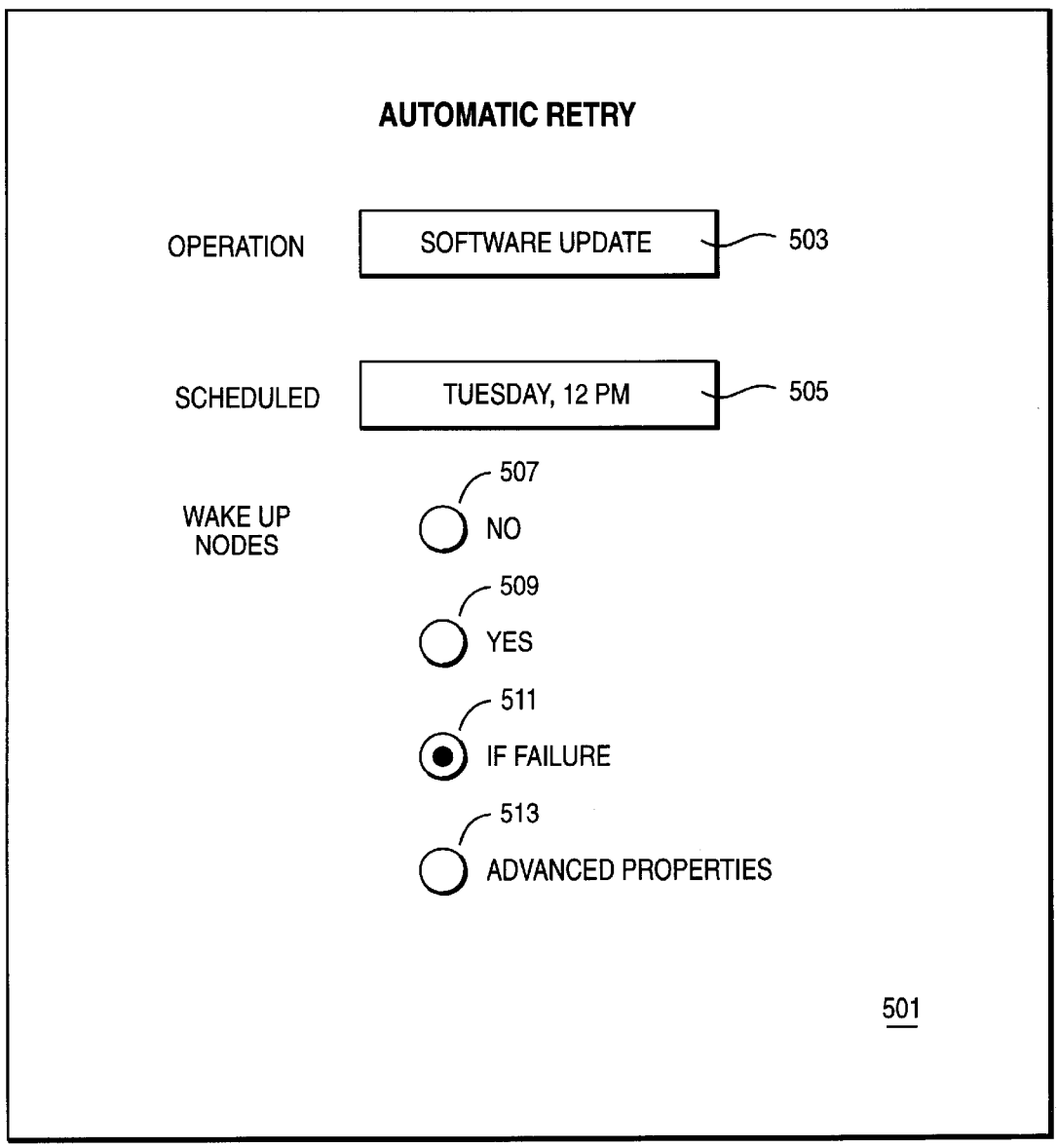
FIG. 6 illustrates a representative user interface in which an administrator can preset given network operations for the optimistic, pessimistic or user controlled modes of the present invention.

FIG. 6 shows a simplified user interface which might be used by a system administrator to configure a system operation according to the present invention. In panel 501, and entry field 503 allows the entry of an operation, in this case a software distribution, to be entered by the administrator. One skilled in the art would recognize that the exact command is likely to be a good deal more complex than "software update", however, for purposes of illustration and since the commands will vary greatly between operating environments the figure will suffice. A field 505 is used to schedule the operation. In this case, it an operation which scheduled for a single instance at some time in the future. Periodically scheduled operations or operations which occur immediately after entry of the necessary information by the system administrator are also encompassed by the invention.

The panel 501 also shows a set of controls 507–513 which can be used to select various modes for the present invention. The "no" control 507 allows the administrator the option of not issuing a magic packet for the operation. The administrator might know that the remote node is up, or may wish to avoid any increase in demand on an already taxed network. The "yes" control 509 is a selection for the preemptive or pessimistic mode which will result in the magic packet being sent to the node or nodes prior to the attempt to perform the system operation. The "if failure" control 511 selects the optimistic mode which will reduce network demand when compared with the pessimistic mode, and provide better reliability at the cost of slightly greater load when compared to the no magic packet option.

Finally, although the above options are viewed as sufficient for most users, the "advanced properties" control 513 allows an administrator to finely tune the present invention further. If this control was selected, another panel or set of panels (not shown) would appear allowing the administrator to select various options depending upon network conditions at the time a given operation was scheduled. For example, if the network load was below a certain metric, the administrator might choose the pessimistic mode, figuring that the extra bandwidth could easily be absorbed by the network. If the load was above the metric, the optimistic mode would be used. If the load was above a higher metric, no magic packets would be issued. Alternatively, for hourly updates or operations, the times of the day might determine whether the operation was to be attempted under the pessimistic, i.e. night, or optimistic, i.e. day, modes. After the administrator has selected the parameters for the conditions under which the various modes of the invention are to be invoked, the retry mechanism would monitor the system for these conditions and act accordingly.

Further, the panels could be used to specify, e.g., by machine or group ID, which nodes or groups do or not receive the magic packets. For example, the administrator might know that the machines in a certain subnet are backlevel and would not benefit from the present invention. Therefore, he would block by means of the interface those machines from receiving magic packets regardless of current network conditions to conserve network bandwidth.

Other refinements to the basic invention are possible. Artificial intelligence (AI) can be added to the retry mechanism. Rather than provide a panel for the system administrator to control the use of the present invention, the various modes of the invention would be invoked according to the monitored conditions and rules which govern the artificial intelligence. Thus, workload and time of day could be used by the AI to choose the pessimistic, optimistic or no magic packet mode for the system operations invoked by the network users. The AI can adaptively learn based on the use patterns of specific machines, e.g., it "knows" that a certain machine is usually powered down at certain times. Therefore, whenever a system operation is requested for that machine, it preemptively issues a magic packet to wake the machine. It can also learn from the success or failure of past operations at different modes, times and network loads, thus predicting which mode should be chosen for a current operation. For example, if a software distribution of a certain size caused a magic packet storm or other deleterious effect on the network when performed in pessimistic mode, the AI will choose optimistic mode for future distributions of similar size. Of course, this embodiment of the invention would require the addition of an AI engine, an AI rule database and a history database to the basic invention described above. Other databases containing data on machine type and monitoring services could be provided as part of the retry mechanism. However, many system management suites and operating systems already provide many of these services so that the retry mechanism need only make system calls for the required data.

For purposes of a complete description, the Magic Packet technology is described below.

The Magic Packet technology is used to remotely wake up a sleeping or powered off computer on a network. This is practiced by sending a specific packet of data, called a Magic Packet frame, to a node on the network. When a computer capable of receiving the Magic Packet frame goes to sleep, it will enable the Magic Packet mode in the network controller. When the LAN controller receives a Magic Packet frame, it will alert the computer system to wake up.

Once the LAN controller has been put into the Magic Packet mode, it scans all incoming frames addressed to the node for a specific data sequence, which indicates to the controller that this is a Magic Packet frame. A Magic Packet frame must also meet the basic requirements for the LAN technology chosen, e.g., it must include SOURCE ADDRESS, DESTINATION ADDRESS and CRC. The Magic Packet frame consists of 16 duplications of the IEEE address of this node, with no breaks or interruptions. This sequence can be located anywhere within the packet, but, according to the Magic Packet protocol, must be preceded by a synchronization stream.

The synchronization stream is defined as 6 bytes of FFh. The device will also accept a BROADCAST frame, as long as the 16 duplications of the IEEE address match the address of the machine to be awakened. If the IEEE address for a particular node on the network was 11h 22h 33h 44h 55h 66h, then the LAN controller would be scanning for the data sequence (assuming an Ethernet Frame):

| DESTINATION | | | | SOURCE | | | MISC. | | | FF FF FF FF FF FF | | | | | | 11 | |
|---|---|---|---|---|---|---|---|---|---|---|---|---|---|---|---|---|---|
| 22 | 33 | 44 | 55 | 66 | 11 | 22 | 33 | 44 | 55 | 66 | 11 | 22 | 33 | 44 | 55 | 66 | 11 | 22 |
| 33 | 44 | 55 | 66 | 11 | 22 | 33 | 44 | 55 | 66 | 11 | 22 | 33 | 44 | 55 | 66 | 11 | 22 | 33 |
| 44 | 55 | 66 | 11 | 22 | 33 | 44 | 55 | 66 | 11 | 22 | 33 | 44 | 55 | 66 | 11 | 22 | 33 | 44 |
| 55 | 66 | 11 | 22 | 33 | 44 | 55 | 66 | 11 | 22 | 33 | 44 | 55 | 66 | 11 | 22 | 33 | 44 | 55 |
| 66 | 11 | 22 | 33 | 44 | 55 | 66 | 11 | 22 | 33 | 44 | 55 | 66 | 11 | 22 | 33 | 44 | 55 | 66 |
| MISC. | | | | CRC. | | | | | | | | | | | | | | |

The Magic Packet frame could be in a TCP/IP packet, an IPX packet, or may be bridged or routed across the network, without affecting its ability to wake up a node at the destination of the frame. If the LAN controller scans a frame and does not discover the specific sequence shown above, it dumps the frame and takes no further action. If the controller spots the data sequence, however, then it alerts the system's power management circuitry to wake up the system.

Hewlett-Packard, IBM, Gateway and other leading manufacturers implement AMD's Magic Packet technology.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for retrying a system operation on a remote node, comprising the steps of:

issuing a set of commands over a network to a remote node to perform a system operation;

responsive to a failure by the remote node to perform the requested system operation, determining whether the remote node could be in a node down state;

responsive to the determination that the remote node could be in the node down state, issuing a magic packet to the remote node;

waiting a predetermined period of time for the remote node to be brought to an operational state; and issuing the set of commands to the remote node to perform the system operation.

2. The method as recited in claim 1 further comprising the step of determining that the remote node has been brought to the operational state subsequent to the waiting step.

3. The method as recited in claim 1 the determining step is performed by determining that an acknowledgment has not been received from the remote node.

4. The method as recited in claim 1 wherein the set of commands was issued to a first plurality of remote nodes.

5. The method as recited in claim 4 wherein failure is detected in a second plurality of remote nodes which are a subset of the first plurality of nodes, and the method further comprises the steps of:
   determining a list of remote nodes in the second plurality which are equipped to react to a magic packet and may be in a node down state;
   issuing a magic packet to each of the remote nodes in the list; and
   issuing the set of commands to each of the remote nodes in the list.

6. The method as recited in claim 5 wherein remote nodes which have responded to the first issuance of the set of commands or have communicated to a server within a predetermined period of time are not included in the list of remote nodes.

7. A method for performing a system operation on a remote node, comprising the steps of:
   receiving a request to perform the system operation on the remote node;
   responsive to the request for performing the system operation on the remote node, issuing a magic packet to the remote node over a network; and
   issuing a set of commands over the network to the remote node to perform the system operation.

8. The method as recited in claim 7 further comprising the step of determining whether the remote node could be in a node down state prior to issuance of the magic packet and the step of issuing the magic packet is contingent upon a determination of a possible node down state.

9. The method as recited in claim 7 further comprising the step of determining a network condition and the step of issuing the magic packet is contingent upon a determination of the network condition.

10. The method as recited in claim 9 wherein the network condition is a network load.

11. The method as recited in claim 7 further comprising the step of determining that the remote node is equipped to react to the magic packet and the step of issuing the magic packet is contingent upon a determination of that the remote node is equipped to react to the magic packet.

12. The method as recited in claim 7 further comprising the steps of:
   receiving a request to perform a system operation on a plurality of remote nodes;
   determining a list of remote nodes to which send a magic packet, the list being a subset of the plurality of remote nodes;
   sending a magic packet to each of the remote nodes on the list; and
   performing the system operation on the plurality of remote nodes.

13. The method as recited in claim 12 wherein the list is determined by selecting remote nodes in the plurality of remote nodes which are equipped to respond to the magic packet.

14. The method as recited in claim 12 wherein the list is determined by selecting remote nodes in the plurality of remote nodes for which no recent activity has been recorded.

15. A method for retrying a system operation on a remote node, comprising the steps of:
   receiving a request to perform a system operation on a remote node;
   determining a current network state;
   responsive to determining a first network state, entering an optimistic mode for retrying the system operation, wherein commands are issued to the remote node to perform the system action, and upon failure of the remote node to respond, issuing a magic packet to the remote node and subsequently issuing the commands to the remote node a second time; and
   responsive to determining a second network state, entering a preemptive mode for retrying the system operation, wherein a magic packet is issued to the remote node prior to issuing the commands to perform the system action to the remote node.

16. The method as recited in claim 15 further comprising the step of responsive to determining a third network state in which no magic packet is issued to the remote node.

17. The method as recited in claim 15, wherein a set of network conditions which define the first and second network states include a relative network load.

18. The method as recited in claim 15, a set of network conditions which define the first and second network states include a time of day.

19. The method as recited in claim 15, wherein the request to perform a system operation is a request to perform the system operation on a plurality of remote nodes.

20. The method as recited in claim 19, further comprising the step of selecting a list of remote nodes to send magic packets from the plurality of remote nodes based on machine type.

21. The method as recited in claim 19, further comprising the step of accepting user input to define the set of network conditions which define the first and second network states.

22. The method as recited in claim 21, further comprising the step of defining the set of network conditions which define the first and second network states based on past network performance.

23. A computer program product in a computer readable medium for retrying a system operation on a remote node, comprising:
   means for issuing a set of commands over a network to a remote node to perform a system operation;
   means responsive to a failure by the remote node to perform the requested system operation for determining whether the remote node could be in a node down state;
   means responsive to the determination that the remote could be in the node down state for issuing a magic packet to the remote node; and
   means for issuing the set of commands to the remote node to perform the system operation.

24. A system for performing a system operation on a remote node, comprising:
   means for receiving a request to perform the system operation on the remote node;
   means responsive to the request for performing the system operation on the remote node for issuing a magic packet to the remote node over a network; and
   means for issuing a set of commands over the network to the remote node to perform the system operation.

25. The system as recited in claim 24 further comprising means for determining whether the remote node could be in a node down state.

* * * * *